(12) United States Patent
Sartran et al.

(10) Patent No.: US 10,701,092 B2
(45) Date of Patent: Jun. 30, 2020

(54) ESTIMATING FEATURE CONFIDENCE FOR ONLINE ANOMALY DETECTION

(71) Applicant: Cisco Technology, Inc., San Jose, CA (US)

(72) Inventors: Laurent Sartran, Palaiseau (FR); Sébastien Gay, Les Rousses (FR); Jean-Philippe Vasseur, Saint Martin d'uriage (FR); Grégory Mermoud, Veyras (CH)

(73) Assignee: Cisco Technology, Inc., San Jose, CA (US)

( * ) Notice: Subject to any disclaimer, the term of this patent is extended or adjusted under 35 U.S.C. 154(b) by 268 days.

(21) Appl. No.: 15/364,440

(22) Filed: Nov. 30, 2016

(65) Prior Publication Data

US 2018/0152466 A1    May 31, 2018

(51) Int. Cl.
*H04L 29/06* (2006.01)
(52) U.S. Cl.
CPC ...... *H04L 63/1425* (2013.01); *H04L 63/1416* (2013.01)
(58) Field of Classification Search
CPC ................. H04L 63/1416; H04L 63/1425
USPC .......................................................... 726/23
See application file for complete search history.

(56) References Cited

U.S. PATENT DOCUMENTS

| | | | | |
|---|---|---|---|---|
| 5,153,532 A | * | 10/1992 | Albers | H03K 3/84 331/78 |
| 8,028,055 B2 | | 9/2011 | Duffield et al. | |
| 8,065,722 B2 | * | 11/2011 | Barford | H04L 63/1416 370/229 |
| 8,149,162 B1 | * | 4/2012 | Pauls | G01S 5/0278 342/351 |
| 8,219,593 B2 | * | 7/2012 | Tunkelang | G06F 17/30424 707/803 |
| 8,504,504 B2 | * | 8/2013 | Liu | H04L 63/1458 706/46 |
| 8,527,515 B2 | * | 9/2013 | Zelevinsky | G06F 17/30424 707/737 |

(Continued)

OTHER PUBLICATIONS

Ndong, Joseph., "A New Approach to Anomaly Detection based on Possibility Distributions", Internet 2014 : The Sixth International Conference on Evolving Internet, 2014, 8 pages, IARIA.

(Continued)

*Primary Examiner* — Dant B Shaifer Harriman
(74) *Attorney, Agent, or Firm* — Behmke Innovation Group LLC; James M. Behmke; Jonathon P. Western

(57) ABSTRACT

In one embodiment, a device in a network obtains characteristic data regarding one or more traffic flows in the network. The device incrementally estimates an amount of noise associated with a machine learning feature using bootstrapping. The machine learning feature is derived from the sampled characteristic data. The device applies a filter to the estimated amount of noise associated with the machine learning feature, to determine a value for the machine learning feature. The device identifies a network anomaly that exists in the network by using the determined value for the machine learning feature as input to a machine learning-based anomaly detector. The device causes performance of an anomaly mitigation action based on the identified network anomaly.

20 Claims, 18 Drawing Sheets

(56) References Cited

U.S. PATENT DOCUMENTS

| | | | | |
|---|---|---|---|---|
| 8,694,630 B1* | 4/2014 | Keralapura | ......... | H04L 47/2441 709/223 |
| 9,191,400 B1* | 11/2015 | Ptasinski | ............. | H04L 63/1416 |
| 9,450,972 B2 | 9/2016 | Cruz Mota et al. | | |
| 9,872,188 B2* | 1/2018 | Yang | ..................... | H04W 24/08 |
| 2005/0243789 A1* | 11/2005 | Dinello | ............... | H04L 63/0236 370/341 |
| 2006/0115146 A1* | 6/2006 | Ogura | ................ | G06K 9/00127 382/159 |
| 2006/0242706 A1* | 10/2006 | Ross | ....................... | G06F 21/55 726/23 |
| 2009/0245109 A1* | 10/2009 | Hurley | .................. | H04L 41/142 370/235 |
| 2010/0067765 A1* | 3/2010 | Buther | ................... | A61B 6/032 382/131 |
| 2010/0138646 A1* | 6/2010 | Aloni | .................. | H04N 21/2343 713/150 |
| 2011/0072330 A1* | 3/2011 | Kolze | .............. | H03M 13/1515 714/758 |
| 2011/0106577 A1* | 5/2011 | Nakazato | ......... | G06F 17/30598 705/7.27 |
| 2011/0205359 A1* | 8/2011 | Lee | .................. | G08B 13/19608 348/143 |
| 2012/0084439 A1* | 4/2012 | Fukuyama | ............ | H04L 43/067 709/224 |
| 2012/0124032 A1* | 5/2012 | Zelevinsky | ....... | G06F 17/30657 707/722 |
| 2014/0108319 A1* | 4/2014 | Klauser | ............... | H04L 41/0816 706/47 |
| 2014/0113588 A1* | 4/2014 | Chekina | ................ | G06F 21/552 455/410 |
| 2014/0149806 A1* | 5/2014 | Khalastchi | ......... | G06K 9/00496 714/49 |
| 2014/0372348 A1* | 12/2014 | Lehmann | ............. | G06K 9/6265 706/12 |
| 2015/0142384 A1* | 5/2015 | Chao | .................... | G06F 11/008 702/181 |
| 2018/0001139 A1* | 1/2018 | Moyerman | ............ | G01R 33/02 |

OTHER PUBLICATIONS

Adibi, et al., Measuring Confidence Intervals in Link Discovery: A Bootstrap Approach, ACM SIGKDD 2004, Aug. 2004, 10 pages, ACM.

Tan, et al., "On Predictability of System Anomalies in Real World", 2010 IEEE International Symposium on Modeling, Analysis and Simulation of Computer and Telecommunication Systems, 8 pages, Aug. 2010, IEEE.

\* cited by examiner

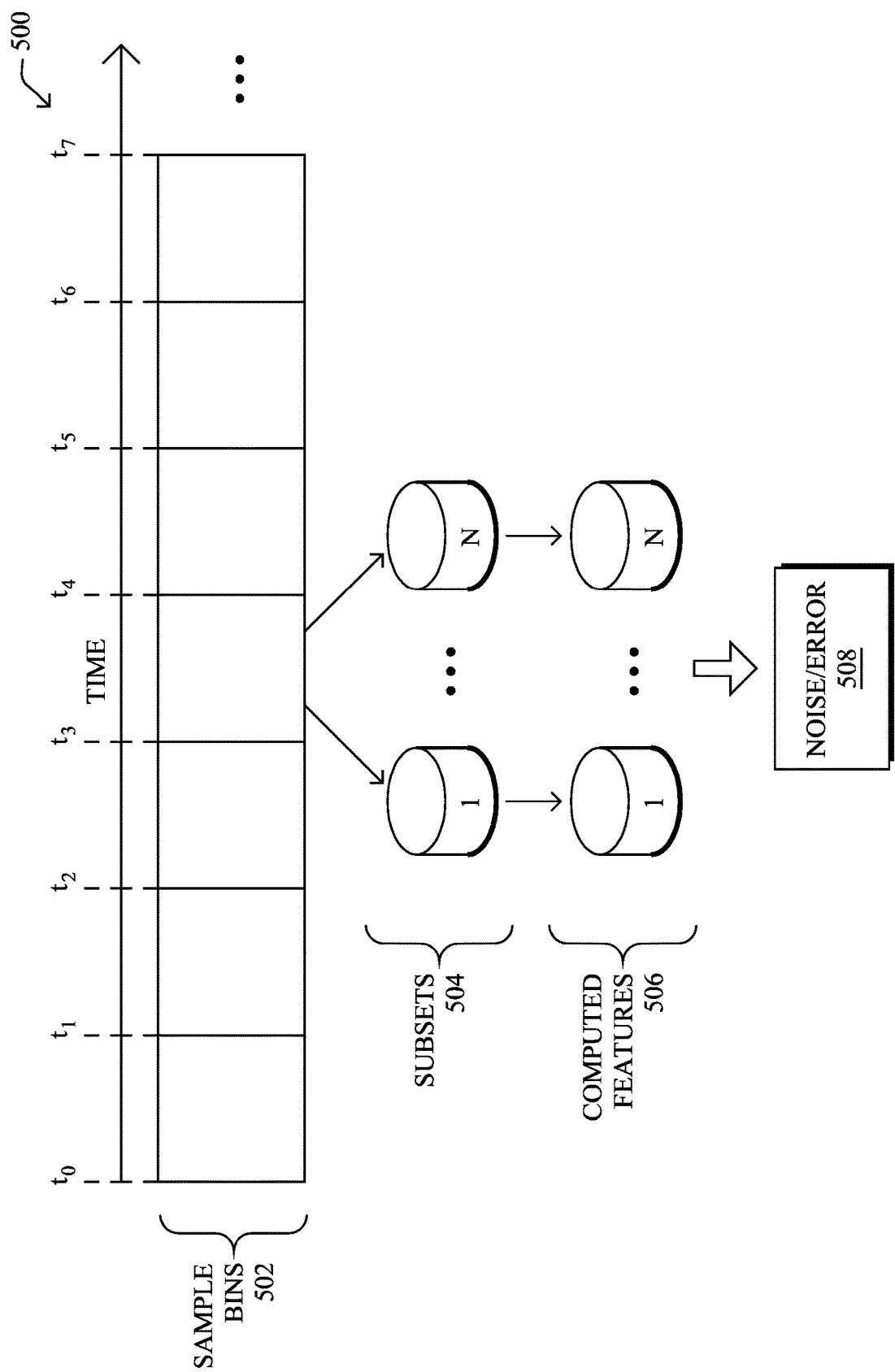

ESTIMATING FEATURE CONFIDENCE FOR ONLINE ANOMALY DETECTION

TECHNICAL FIELD

The present disclosure relates generally to computer networks, and, more particularly, to estimating feature confidence for online anomaly detection.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 5 illustrates an example flow of the calculation of noise/error in sampled traffic characteristics;

DESCRIPTION OF EXAMPLE EMBODIMENTS

Overview

Figure 1A:
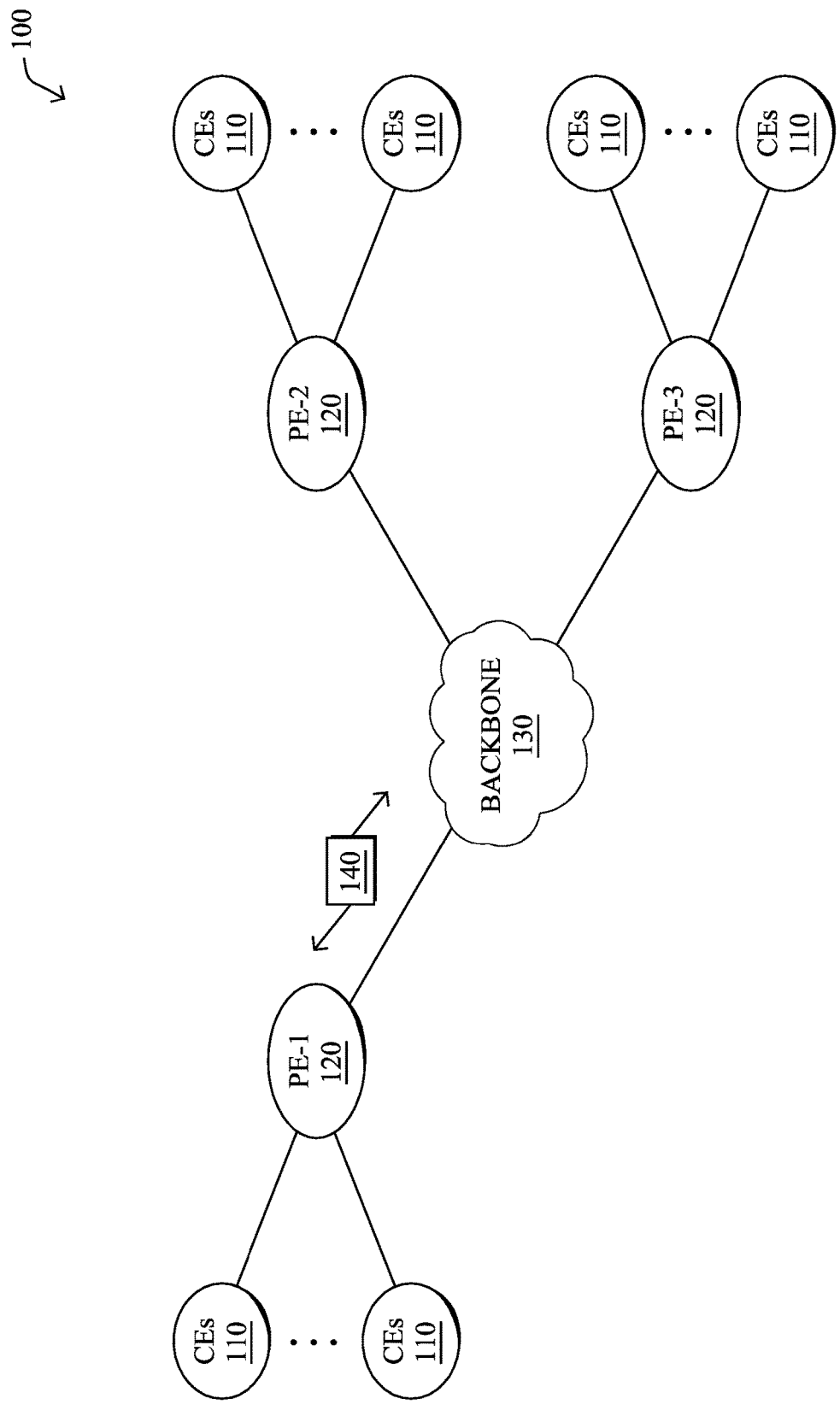
FIGS. 1A-1B illustrate an example communication network.

According to one or more embodiments of the disclosure, a device in a network obtains characteristic data regarding one or more traffic flows in the network. The device incrementally estimates an amount of noise associated with a machine learning feature using bootstrapping. The machine learning feature is derived from the sampled characteristic data. The device applies a filter to the estimated amount of noise associated with the machine learning feature, to determine a value for the machine learning feature. The device identifies a network anomaly that exists in the network by using the determined value for the machine learning feature as input to a machine learning-based anomaly detector. The device causes performance of an anomaly mitigation action based on the identified network anomaly.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications)

temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
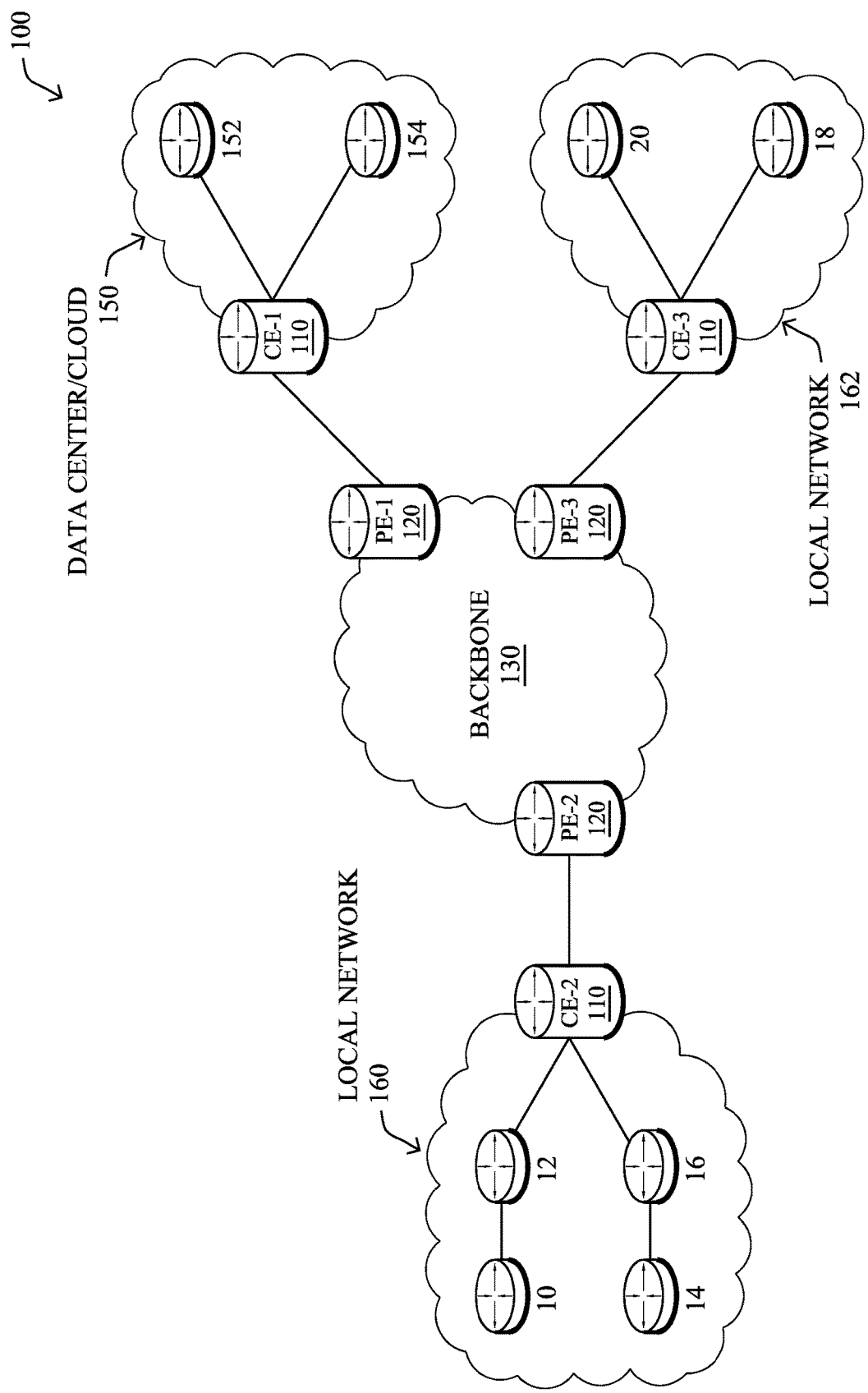

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
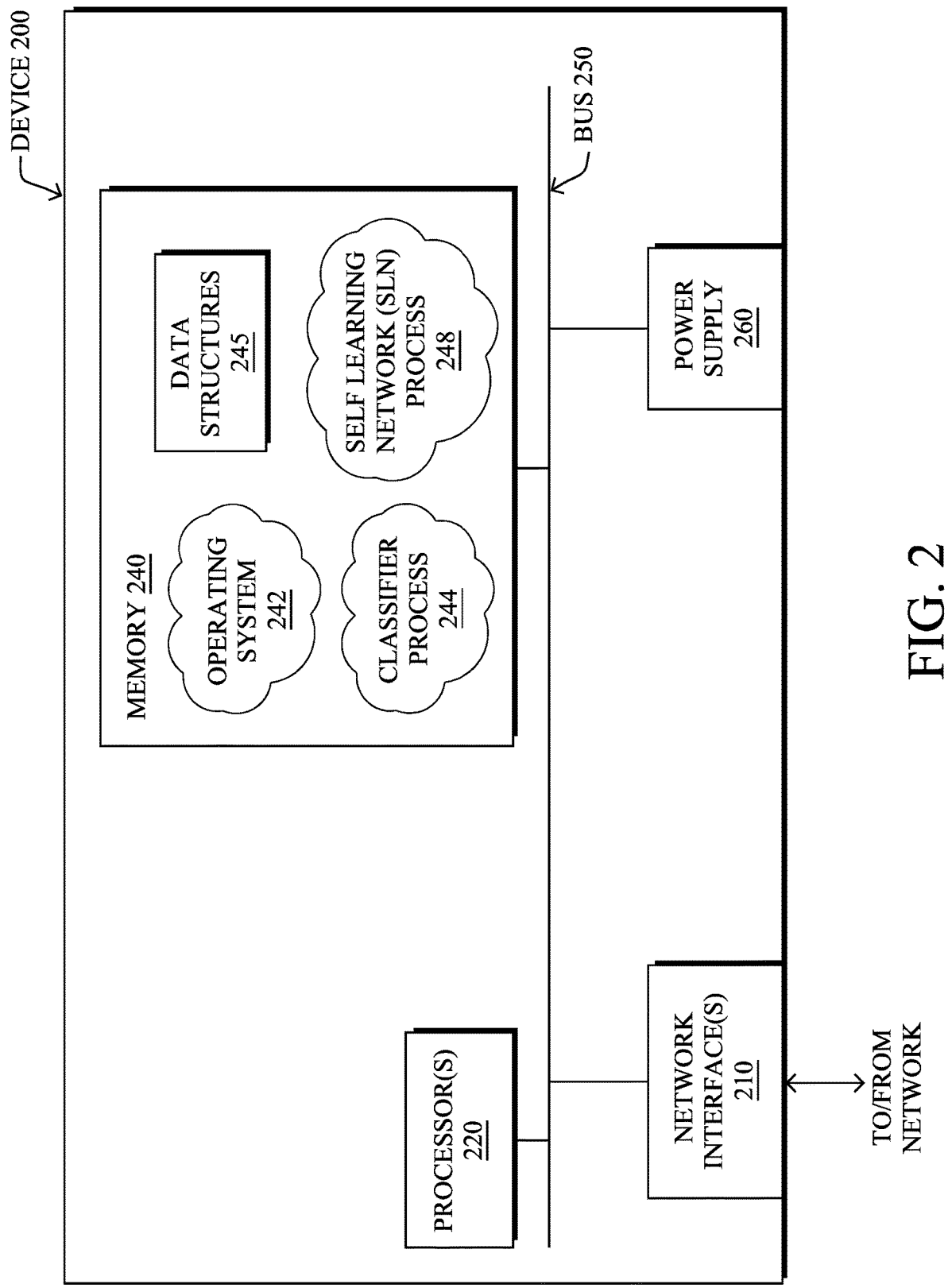
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Machine learning processes may detect these types of anomalies using advanced approaches capable of modeling subtle changes or correlation between changes (e.g., unexpected behavior) in a highly dimensional space. Such anomalies are raised in order to detect, e.g., the presence of a 0-day malware, malware used to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

SLN process 248 may detect malware based on the corresponding impact on traffic, host models, graph-based analysis, etc., when the malware attempts to connect to a C2 channel, attempts to move laterally, or exfiltrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, an SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured access control list (ACL), route redistribution policy, routing policy, QoS policy maps, or the like, may have dramatic consequences such a traffic black-hole, QoS degradation, etc. SLN process 248 may advantageously identify these forms of misconfigurations, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
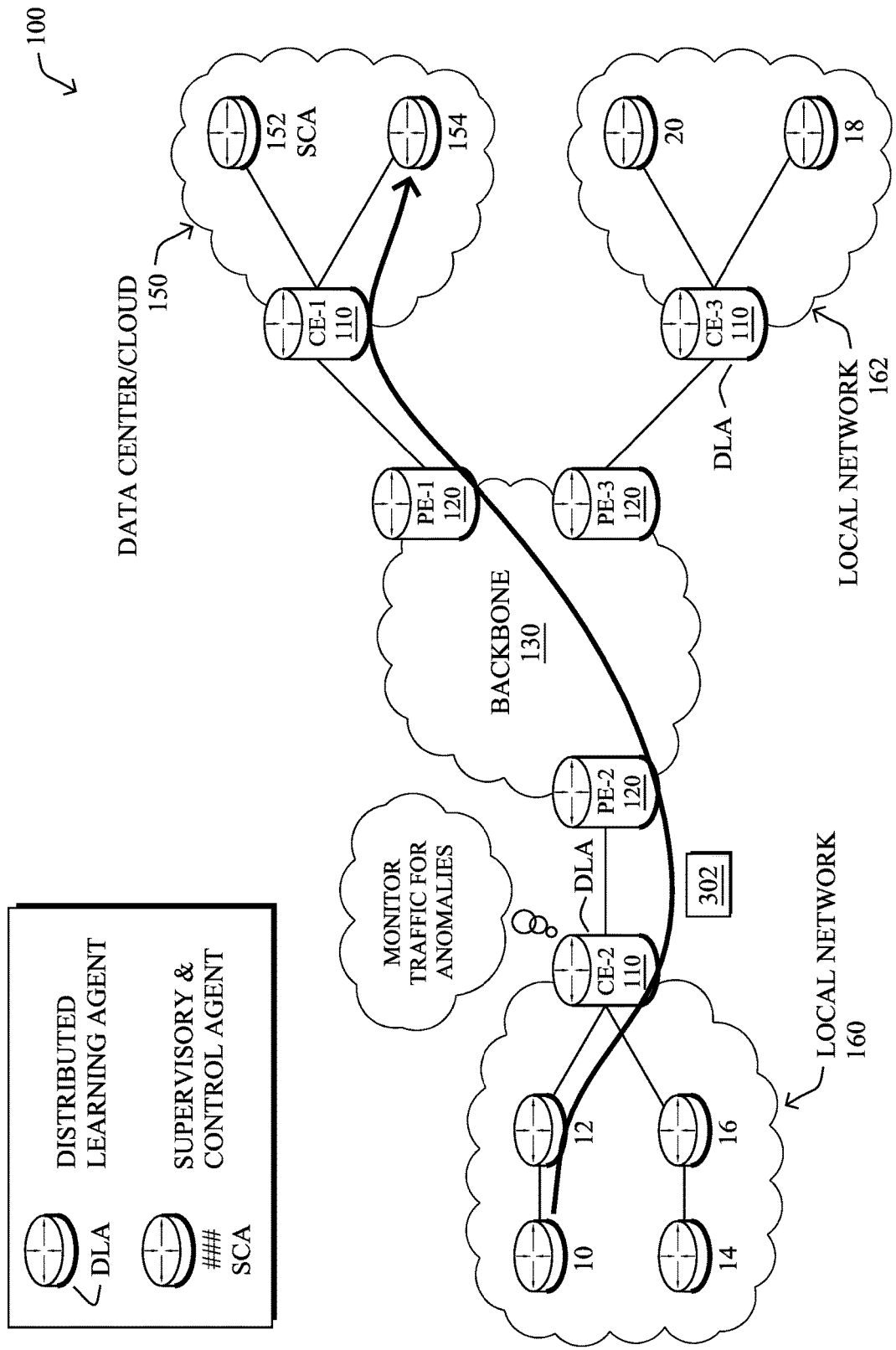
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be operable to monitor network conditions (e.g., router states, traffic flows, etc.), perform anomaly detection on the monitored data using one or more machine learning models, report detected anomalies to the SCA, and/or perform local mitigation actions. Similarly, an SCA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, the anomaly detection mechanisms in network 100 may use Internet Behavioral Analytics (IBA). In general, IBA refers to the use of advanced analytics coupled with networking technologies, to detect anomalies in the network. Although described later with greater details, the ability to model the behavior of a device (networking switch/router, host, etc.) will allow for the detection of malware, which is complementary to the use of a firewall that uses static signatures. Observing behavioral changes (e.g., a deviation from modeled behavior) thanks to aggregated flows records, deep packet inspection, etc., may allow detection of an anomaly such as an horizontal movement (e.g. propagation of a malware, etc.), or an attempt to perform information exfiltration.

Figure 4:
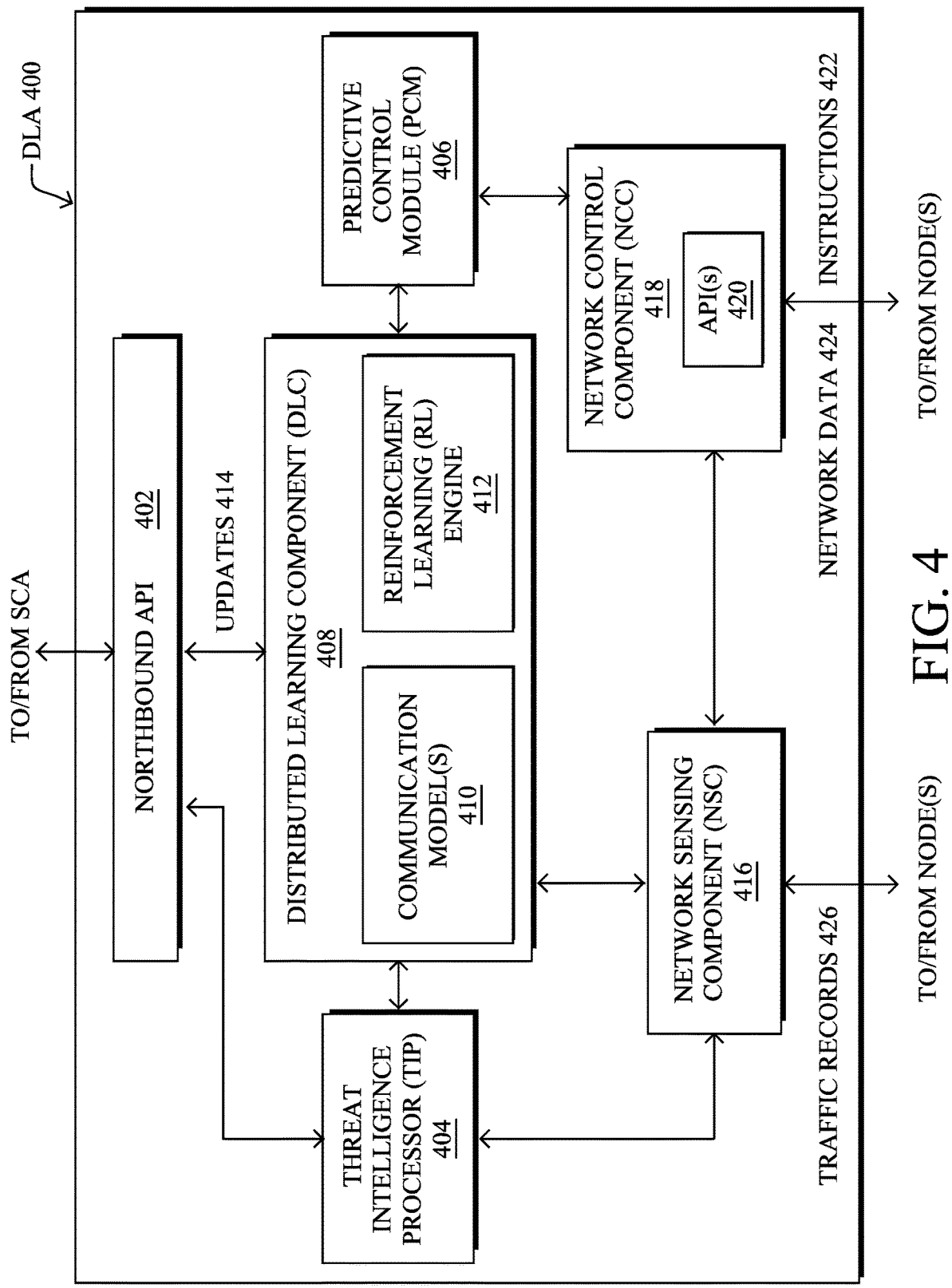
FIG. 4 illustrates an example distributed learning agent (DLA)
Figure 6A:
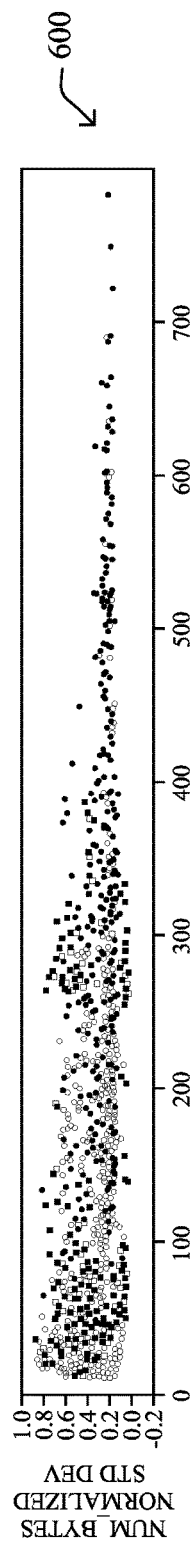
FIGS. 6A-6D illustrate examples of estimated standard deviations of machine learning features.
Figure 6B:
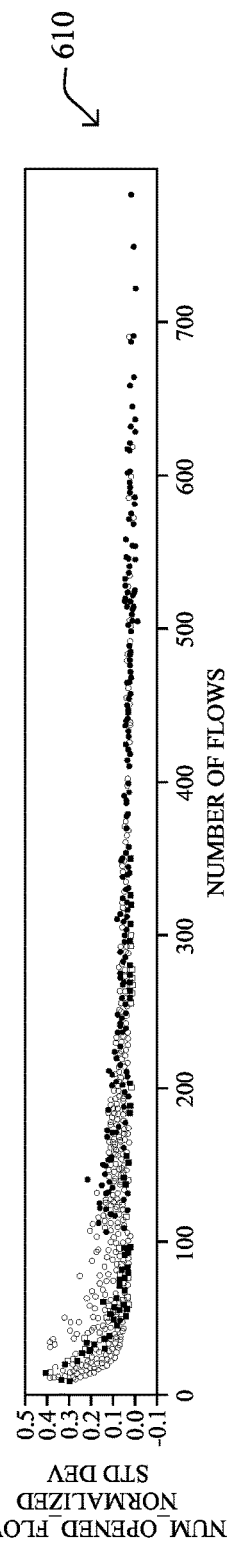
Figure 6C:
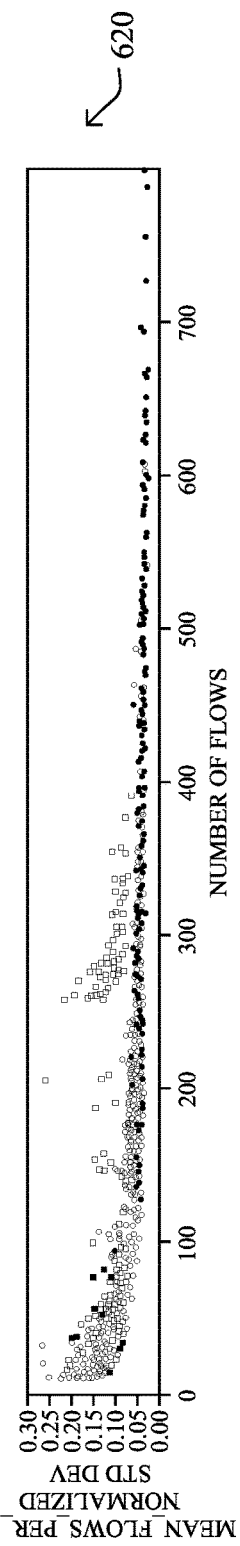
Figure 6D:
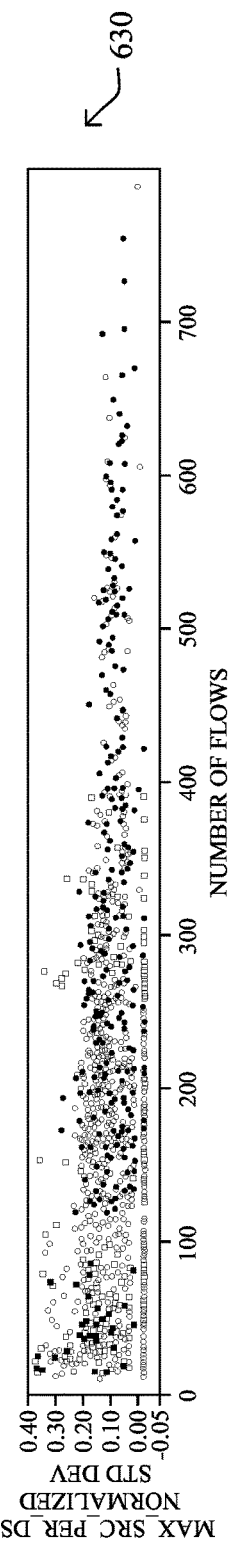

FIG. 4 illustrates an example distributed learning agent (DLA) 400 in greater detail, according to various embodiments. Generally, a DLA may comprise a series of modules hosting sophisticated tasks (e.g., as part of an overall SLN process 248). Generally, DLA 400 may communicate with an SCA (e.g., via one or more northbound APIs 402) and any number of nodes/devices in the portion of the network associated with DLA 400 (e.g., via APIs 420, etc.).

In some embodiments, DLA 400 may execute a Network Sensing Component (NSC) 416 that is a passive sensing construct used to collect a variety of traffic record inputs 426 from monitoring mechanisms deployed to the network nodes. For example, traffic record inputs 426 may include Cisco™ Netflow records, application identification information from a Cisco™ Network Based Application Recognition (NBAR) process or another application-recognition mechanism, administrative information from an administrative reporting tool (ART), local network state information service sets, media metrics, or the like.

Furthermore, NSC 416 may be configured to dynamically employ Deep Packet Inspection (DPI), to enrich the mathematical models computed by DLA 400, a critical source of information to detect a number of anomalies. Also of note is that accessing control/data plane data may be of utmost importance, to detect a number of advanced threats such as data exfiltration. NSC 416 may be configured to perform data analysis and data enhancement (e.g., the addition of valuable information to the raw data through correlation of different information sources). Moreover, NSC 416 may compute various networking based metrics relevant for the Distributed Learning Component (DLC) 408, such as a large number of statistics, some of which may not be directly interpretable by a human.

In some embodiments, DLA 400 may also include DLC 408 that may perform a number of key operations such as any or all of the following: computation of Self Organizing Learning Topologies (SOLT), computation of "features" (e.g., feature vectors), advanced machine learning processes, etc., which DLA 400 may use in combination to perform a specific set of tasks. In some cases, DLC 408 may include a reinforcement learning (RL) engine 412 that uses reinforcement learning to detect anomalies or otherwise assess the operating conditions of the network. Accordingly, RL engine 412 may maintain and/or use any number of communication models 410 that model, e.g., various flows of traffic in the network. In further embodiments, DLC 408 may use any other form of machine learning techniques, such as those described previously (e.g., supervised or unsupervised techniques, etc.). For example, in the context of SLN for security, DLC 408 may perform modeling of traffic and applications in the area of the network associated with DLA 400. DLC 408 can then use the resulting models 410 to detect graph-based and other forms of anomalies (e.g., by comparing the models with current network characteristics, such as traffic patterns. The SCA may also send updates 414 to DLC 408 to update model(s) 410 and/or RL engine 412 (e.g., based on information from other deployed DLAs, input from a user, etc.).

When present, RL engine 412 may enable a feed-back loop between the system and the end user, to automatically adapt the system decisions to the expectations of the user and raise anomalies that are of interest to the user (e.g., as received via a user interface of the SCA). In one embodiment, RL engine 412 may receive a signal from the user in the form of a numerical reward that represents for example the level of interest of the user related to a previously raised event. Consequently the agent may adapt its actions (e.g. search for new anomalies), to maximize its reward over time, thus adapting the system to the expectations of the user. More specifically, the user may optionally provide feedback thanks to a lightweight mechanism (e.g., 'like' or 'dislike') via the user interface.

In some cases, DLA 400 may include a threat intelligence processor (TIP) 404 that processes anomaly characteristics so as to further assess the relevancy of the anomaly (e.g. the applications involved in the anomaly, location, scores/degree of anomaly for a given model, nature of the flows, or the like). TIP 404 may also generate or otherwise leverage a machine learning-based model that computes a relevance index. Such a model may be used across the network to select/prioritize anomalies according to the relevancies.

DLA 400 may also execute a Predictive Control Module (PCM) 406 that triggers relevant actions in light of the events detected by DLC 408. In order words, PCM 406 is the decision maker, subject to policy. For example, PCM 406 may employ rules that control when DLA 400 is to send information to the SCA (e.g., alerts, predictions, recommended actions, trending data, etc.) and/or modify a network behavior itself. For example, PCM 406 may determine that a particular traffic flow should be blocked (e.g., based on the assessment of the flow by TIP 404 and DLC 408) and an alert sent to the SCA.

Network Control Component (NCC) 418 is a module configured to trigger any of the actions determined by PCM 406 in the network nodes associated with DLA 400. In various embodiments, NCC 418 may communicate the corresponding instructions 422 to the network nodes using APIs 420 (e.g., DQoS interfaces, ABR interfaces, DCAC interfaces, etc.). For example, NCC 418 may send mitigation instructions 422 to one or more nodes that instruct the receives to reroute certain anomalous traffic, perform traffic shaping, drop or otherwise "black hole" the traffic, or take other mitigation steps. In some embodiments, NCC 418 may also be configured to cause redirection of the traffic to a "honeypot" device for forensic analysis. Such actions may be user-controlled, in some cases, through the use of policy maps and other configurations. Note that NCC 418 may be accessible via a very flexible interface allowing a coordinated set of sophisticated actions. In further embodiments, API(s) 420 of NCC 418 may also gather/receive certain network data 424 from the deployed nodes such as Cisco™ OnePK information or the like.

The various components of DLA 400 may be executed within a container, in some embodiments, that receives the various data records and other information directly from the host router or other networking device. Doing so prevents these records from consuming additional bandwidth in the external network. This is a major advantage of such a distributed system over centralized approaches that require sending large amount of traffic records. Furthermore, the above mechanisms afford DLA 400 additional insight into other information such as control plane packet and local network states that are only available on premise. Note also that the components shown in FIG. 4 may have a low footprint, both in terms of memory and CPU. More specifically, DLA 400 may use lightweight techniques to compute features, identify and classify observation data, and perform other functions locally without significantly impacting the functions of the host router or other networking device.

As noted above, anomaly detection techniques, like all machine learning techniques, often rely on a numerical representation of the input data set that are referred to in machine learning circles as "features." These features are computed on data that usually has some degree of noise. Estimating the amount of noise and giving an estimate of the actual feature value may improve the detection performance of the anomaly detection system.

More specifically, the above anomaly detection techniques may consider dozens, if not hundreds of different traffic features, such as the number of bytes in the traffic, the maximum number of destinations per source, and the like. In some implementations, these features can be computed using time bins for the sampled data (e.g., every minute, etc.). In an online context, where samples are processed sequentially, it is usually assumed that the samples are statistically independent. Generally, the standard error of the mean of a feature value computed on n samples in a time bin is then simply proportional to 1/sqrt(n) by the Central Limit Theorem.

However, in the context of computer networks traffic patterns, neither the independence hypothesis holds, nor any weaker hypothesis where a variant of the Central Limit Theorem could be applied. First, samples are highly time dependent in this context. For example, there is usually much more traffic during normal business hours than during nights and weekends. Second, the observed aggregated traffic features result from a superposition of a number of different applications. Those applications generate patterns of traffic that are sometimes strongly dependent from one minute to the next. For example, consider two different types of network traffic: video calls and backups via the File Transfer Protocol (FTP). The number of bytes exchanged through video calls may be considered independent from one minute to the next, as it depends of how much people move, talk, etc. However, the number of bytes exchanged through FTP during a backup is usually very constant, hence its value at time t is fully determined by the value a time t−1.

Estimating Feature Confidence for Online Anomaly Detection

The techniques herein allow for the estimation of noise/error associated with machine learning features values. In some aspects, the techniques herein estimate the measurement noise using bootstrapping, to relax the need for an analytic formulation of the standard error. In further aspects, this estimate of the measurement noise may be assessed using a filter (e.g., a Kalman filter, etc.), to estimate the true value of the features and a degree of confidence on the features. These variables are then ready to be processed by machine learning-based processes that use the features as input. Notably, the techniques herein allow for the accurate estimation of the various sources of noise in real world applications, where models that assume sample independence fall short, to combine them and build an optimal estimate of the "true" feature value.

Specifically, according to one or more embodiments of the disclosure as described in detail below, a device in a network obtains characteristic data regarding one or more traffic flows in the network. The device incrementally estimates an amount of noise associated with a machine learning feature using bootstrapping. The machine learning feature is derived from the sampled characteristic data. The device applies a filter to the estimated amount of noise associated with the machine learning feature, to determine a value for the machine learning feature. The device identifies a network anomaly that exists in the network by using the determined value for the machine learning feature as input to a machine learning-based anomaly detector. The device causes performance of an anomaly mitigation action based on the identified network anomaly.

Illustratively, the techniques described herein may be performed by hardware, software, and/or firmware, such as in accordance with the SLN process 248, which may include computer executable instructions executed by the processor 220 (or independent processor of interfaces 210) to perform functions relating to the techniques described herein, e.g., in conjunction with routing process 244.

Operationally, the techniques herein perform two key functions in a network anomaly detection system: 1.) estimating the error/noise on the machine learning feature(s) assessed by the system and 2.) estimating the "true," filtered value of the feature(s) for consumption by the anomaly detection process(es).

Referring now to FIG. 5, an example flow 500 is shown of the calculation of noise/error in sampled traffic characteristics, according to various embodiments. As noted above, traffic samples may arrive sequentially at the anomaly detection device. For example, the DLA shown in FIG. 3 may sample characteristics of traffic flows that flow through the networking device itself or, alternatively, may receive sampled flow characteristics from one or more other devices in the network. In other words, the sampled characteristic data may include traffic measurements for the traffic flows between hosts.

As part of the sampling, the sampled traffic characteristics may arrive in different sample bins 502 which represent different blocks of time. For example, sampled traffic characteristics received between times $T=t_0$ and $T=t_1$ may be considered to be in one sample bin 502, whereas sampled traffic characteristics received between times $T=t_3$ and $T=t_4$ may be considered to be in another sample bin 502. Alternatively, sample bins 502 may correspond to the times at which the samples were taken, as opposed to when the samples were received, in other implementations.

Typically, samples arriving in the same bin 502 (e.g., within the same minute, etc.) may be aggregated to form certain machine learning features for analysis by the anomaly detector. For example, the sampled characteristics may be used to compute an average number of bytes per source host, a maximum number of flows per destination host, etc. More generally, certain machine learning features for the anomaly detector can be computed from a given bin 502 by determining averages, maximums, minimums, sums, entropies, or any other statistical measure of the sampled characteristics in the bin. As would be appreciated, doing so would also make estimating the noise for all of these quantities prohibitively difficult.

In contrast to using analytical approaches to estimate the noise/error, the system may instead estimate the noise/error incrementally and locally in time using bootstrapping, according to various embodiments. Generally, this approach entails the creation of K-number of subsets from a given bin by randomly sampling from the N-number of samples in the bin and computing the feature value of the K-number of subsets. For example, for the sample bin 502 between times $T=t_3$ and $T=t_4$, the system may generate subsets 504 (e.g., a first through $N^{th}$ subset) by randomly sampling the characteristics in the bin. In turn, the system may compute features 506 from the samples in the respective subsets 504 (e.g., to determine N-number of computed features from subsets 504). In some embodiments, the system can then determine the noise/error 508 for the samples by taking the standard deviation of the set of computed features 506.

By way of example, assume that the anomaly detection system samples the byte size associated with a traffic flow over time. To determine the error, the system may randomly sample the byte size measurements from a given time bin, to form N-number of subsets of byte size measurements. In turn, the system may compute the average byte size for each subset, thereby forming a set of computed features of size N. In such a case, the anomaly detection system may compute the noise/error as the standard deviation of the set of computed average byte sizes.

to compute the feature estimates 506 from subsets 504. In turn, the system may use the calculated feature value 506 to estimate the noise/error 508. For example, the system may take the standard deviation of feature subsets 504 as the noise/error of the underlying samples.

This formulation has the advantage that it does not require storing any more samples that what is already stored for computing the feature, and can be thus considered memoryless, an important feature in constrained environments such as SLNs. However, the drawback is that the K-number of subsets have a smaller size than the set on which the feature value was computed. Hence, since the dependence can be assumed between the number of samples on which the feature is computed and the standard deviation observed, the estimate may be inaccurate. Typically, this may overestimate the error on the feature.

In one embodiment, the system may allow repetition in the K-number of subsets until they have the same size as the full set, to improve accuracy of the estimate. However, this can also introduce strong biases. In further embodiments, the system may instead store samples from more than one bin and construct sets, without repetition, of size N. Doing so trades memory for accuracy, as it would require the storage of more samples.

A prototype was constructed using the noise/error estimation techniques described above and the estimated standard deviations of the computed machine learning features are shown in FIGS. 6A-6D. Notably, FIGS. 6A-6D illustrate plots 600-630 of the number of bytes of the flows, the number of opened flows, the mean number of flows per source, and the maximum number of flows from source to destination, respectively. During testing, these estimates were derived by bootstrapping 100 subsets with respect to the number of samples (e.g., flows) on which the feature was computed. The time of day was also taken into account.

From FIGS. 6A-6D, the different relationships can be noted between the number of samples and the standard deviation for each of the features. However, the common trait appears to be an exponential decrease of the standard deviation with the number of samples. However, for some features, like the number of opened flows, this decrease seems to follow almost exactly an exponential decrease, while it is less evident for other features. Looking at the mean number of flows per source, a strong time dependency can also be observed, whereby bootstraps performed on nighttime samples tend to have a higher standard deviation than for daytime samples.

The proposed noise/error estimation method is general in the sense that it does not assume any particular relationship with the number of samples and time. Instead, it locally infers the noise level from the data directly.

A further aspect of the techniques herein attempts to estimate the true value of the feature given the estimation of the noise level for features that can be considered to be continuous in time. In other words, the observed feature value can be assumed to be generated from a latent model with the addition of noise/error.

Briefly, Kalman filters provide a Bayesian framework to estimate this latent feature value, by building a dynamical transition model of the observed value with respect to the previous observed feature values, and a measurement model of the observed value considering measurement noise. In further embodiments, the system may use other types of filters, including non-linear filters, such as an Extended Kalman Filter, a Particle Filter, or the like.

The equations of the two models used by the Kalman filter, simplified for our use case are given as follows:
Transition Model:

$$\hat{x}_t = F_t x_{t-1} + w_t$$

where $\hat{x}_t$ is the estimate of the true feature value at time t, $F_t$ is the state transition model, and $w_t$ is the process noise/error. Here, since there is no dynamic model for the different features, invariance can be assumed: $F_t = I$.

The process noise is usually assumed to be a 0-centered Gaussian function $w_t = N(0, Q_t)$. $Q_t$ can be chosen to be proportional to the time difference between two updates (bins). Indeed, feature values measured right after one another are more likely to be very similar than if measured after a long time (e.g., after a long period of inactivity).
Measurement Model:

$$z_t = H_t x_t + v_t$$

where $z_t$ is the observed feature value at time t, $H_t$ is the measurement model (here, $H_t = I$ can be assumed), and $v_t$ is the measurement noise. This measurement noise is exactly the error modeled by the previous component with bootstrapping.

In some embodiments, the system may compute the combination of these two models optimally using a Kalman filter. The result is a Kalman gain $K_t$ specifying the a posteriori estimate of the feature value:

$$x_t = K_t z_t + (1 - K_t)\hat{x}_t$$

The general principle is that whenever the measurement noise increases, the true feature value becomes more influenced by the transition model. Additionally, whenever the transition model noise increases, it gives more weight to the measurement. This principle was prototyped using actual traffic traces coming from existing networks. In this example, the traffic is aggregated by application (HTTP, DNS etc.), and features were computed using 1-minute time bins.

Figure 7A:
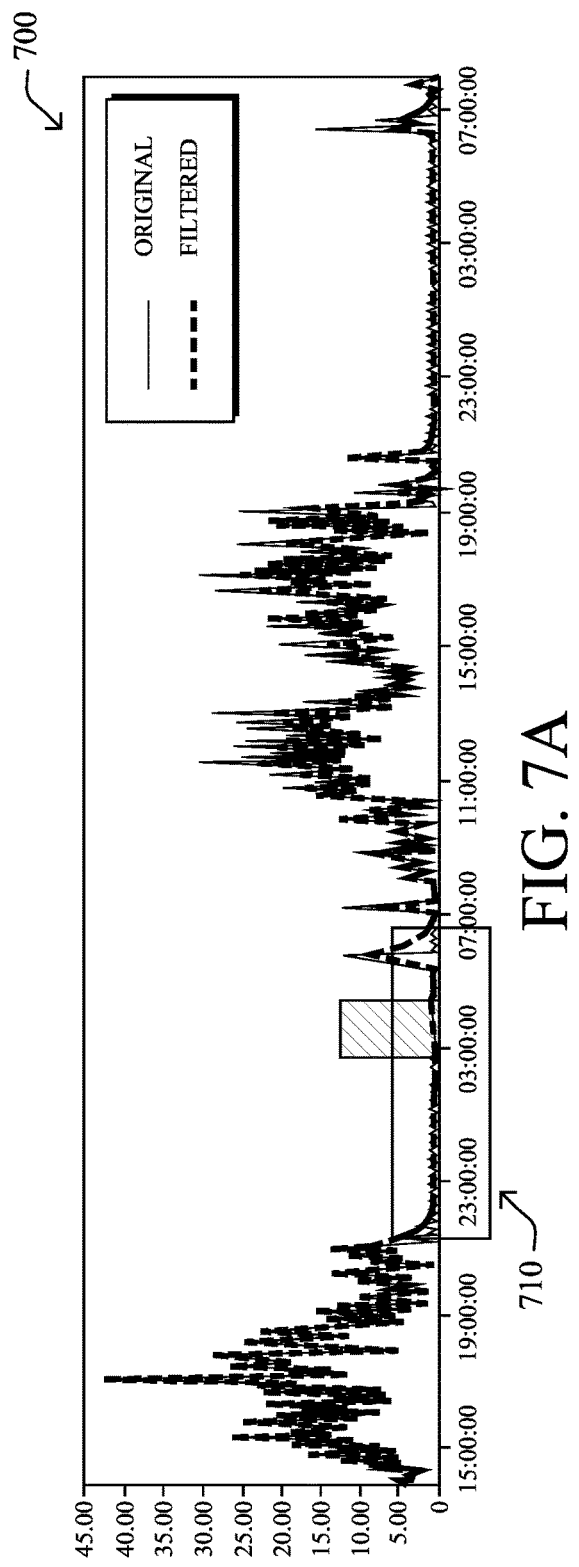
FIGS. 7A-7B illustrate the time evolution of the mean number of packets per destination.
Figure 7B:
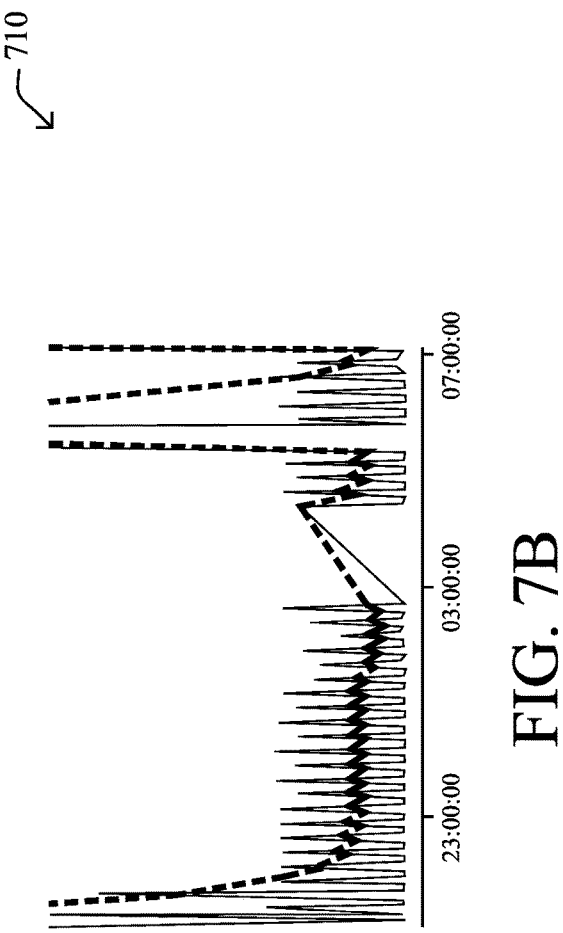
Figure 8A:
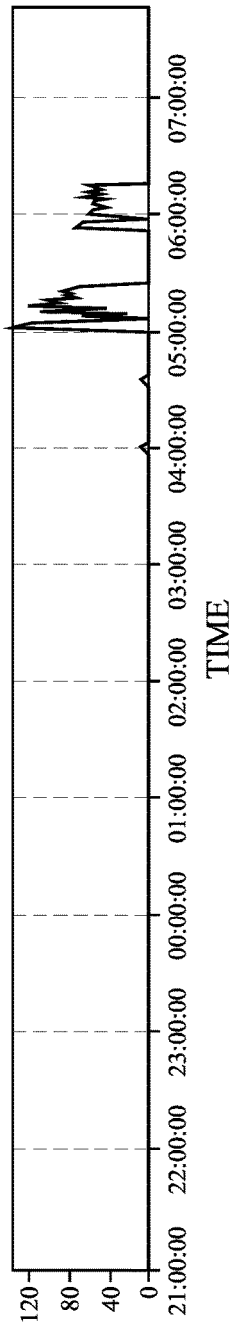
FIGS. 8A-8E illustrate an example trace of a network attack without filtering.
Figure 8B:
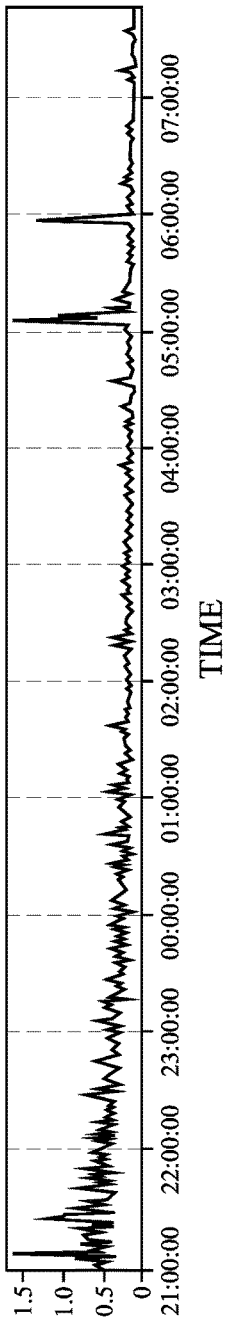
Figure 8C:
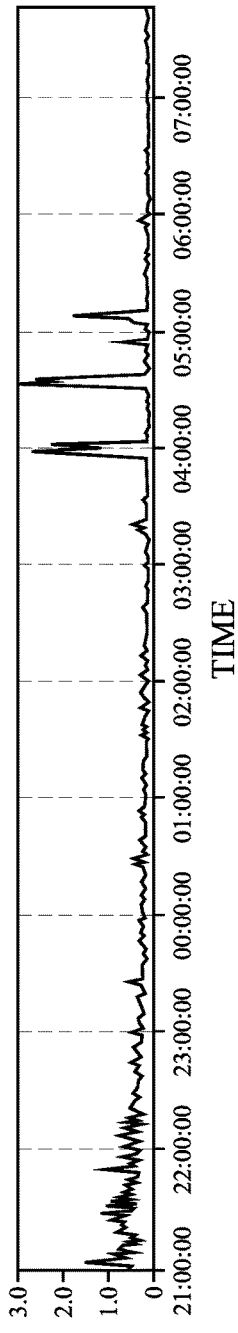
Figure 8D:
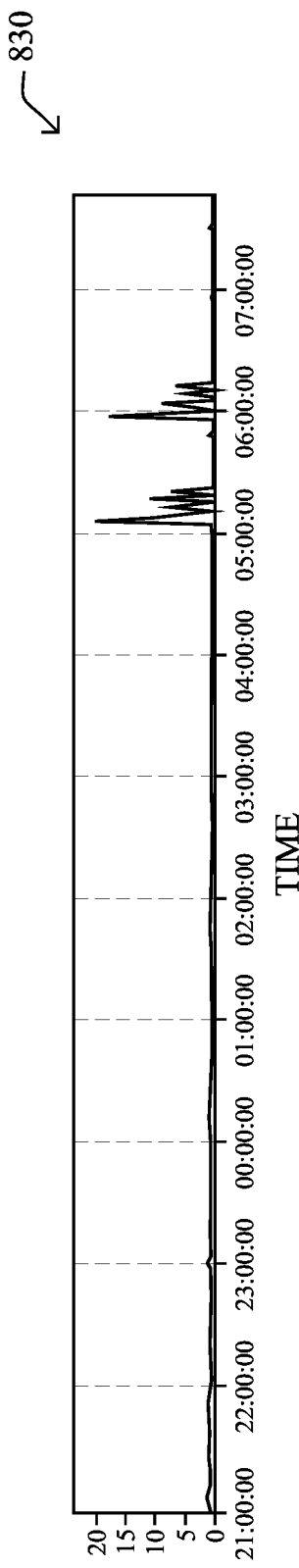
Figure 8E:
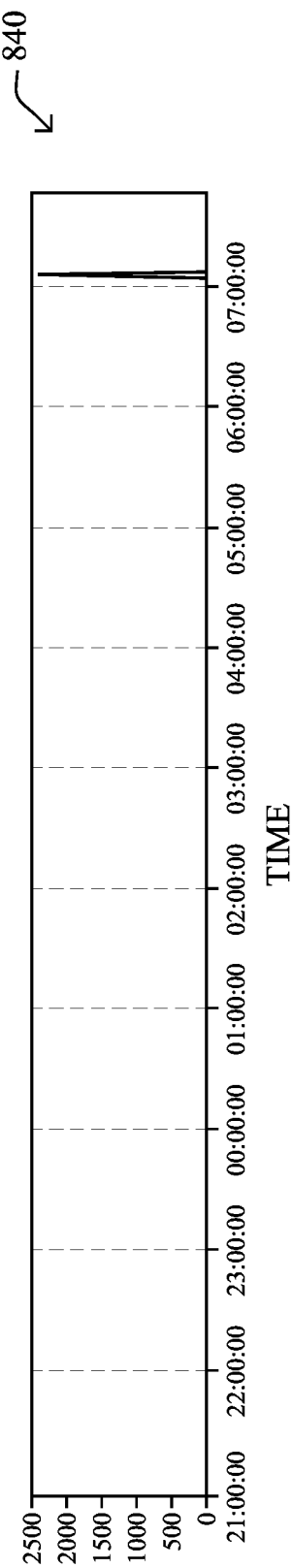
Figure 9A:
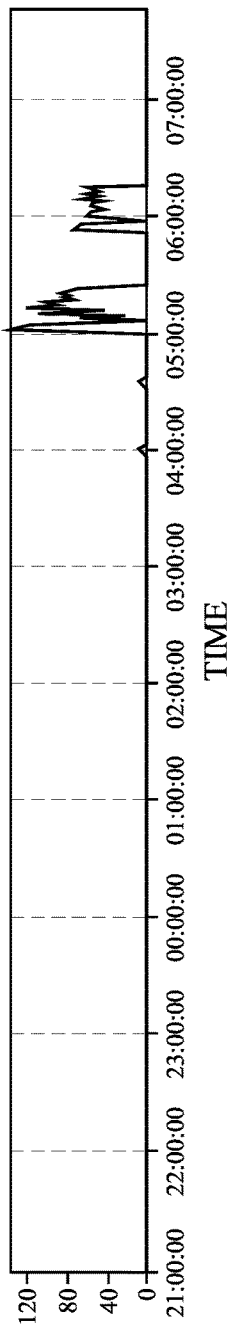
FIGS. 9A-9E illustrate an example trace of a network attack using the filtering techniques herein.
Figure 9B:
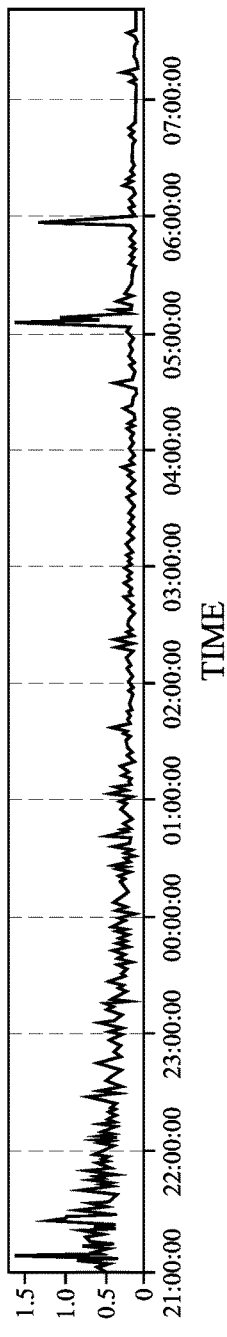
Figure 9C:
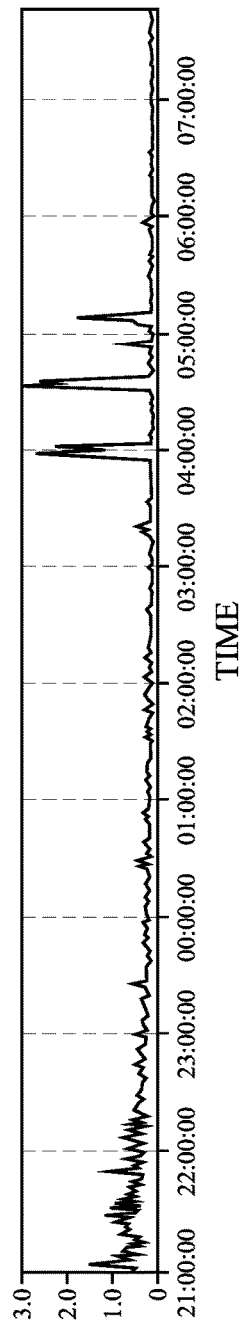
Figure 9D:
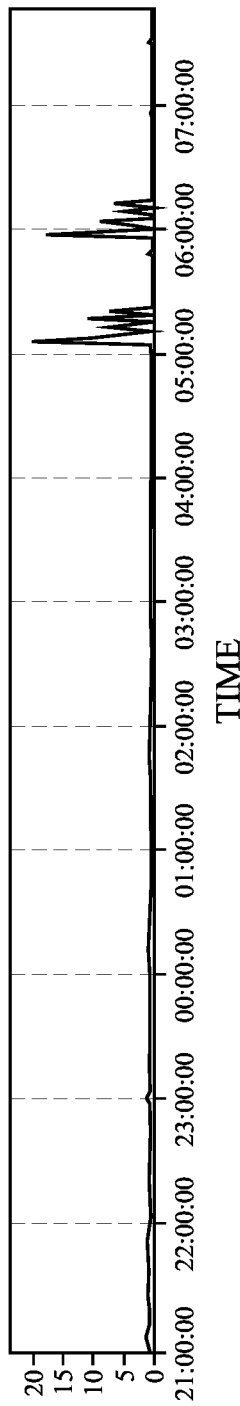
Figure 9E:
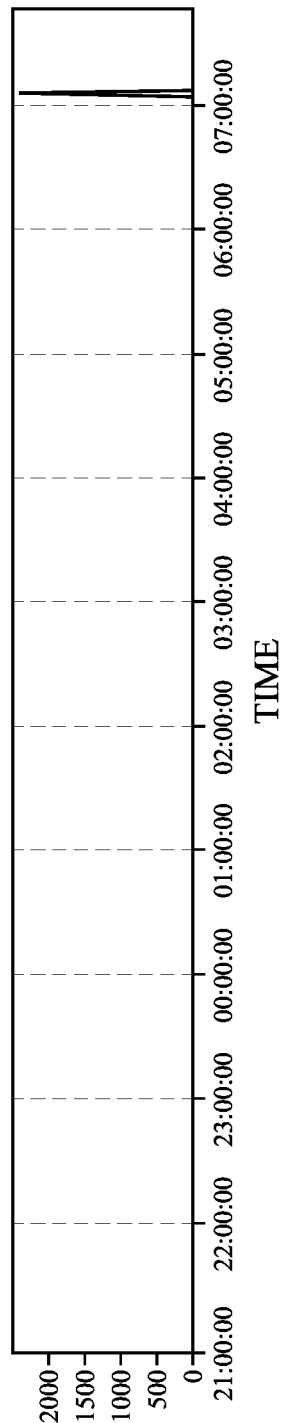
Figure 10A:
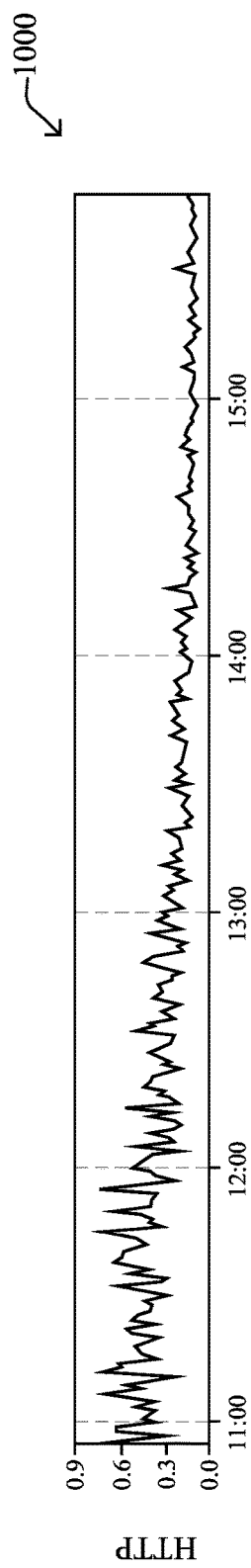
FIGS. 10A-10E illustrate an example trace of benign traffic data without filtering.
Figure 10B:
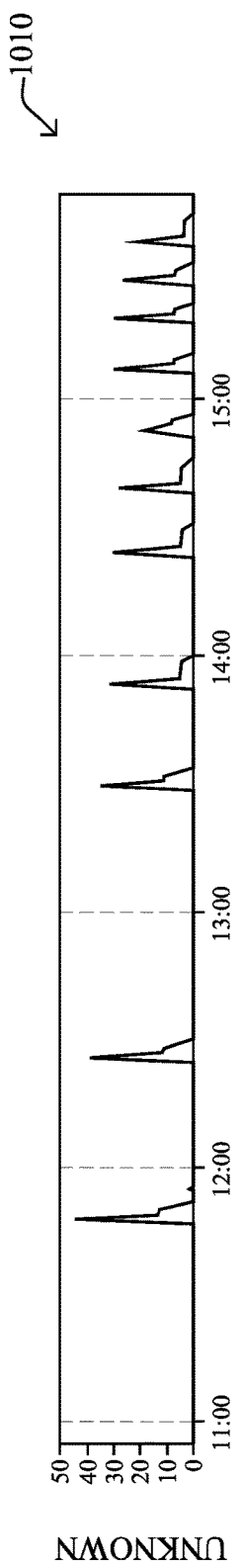
Figure 10C:
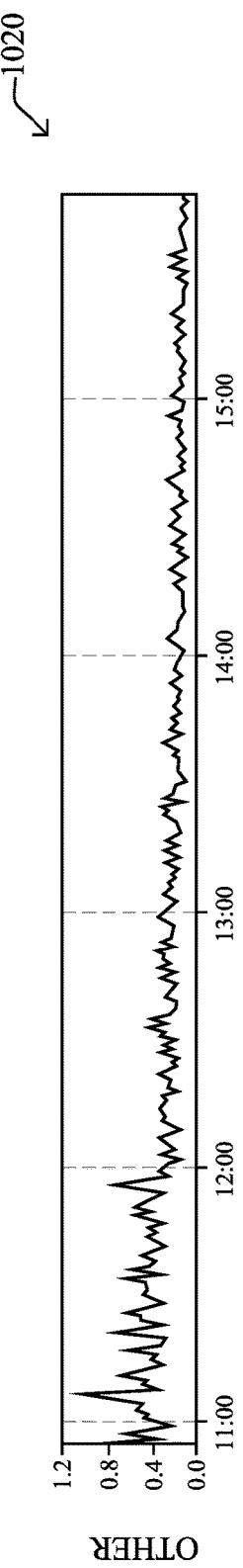
Figure 10D:
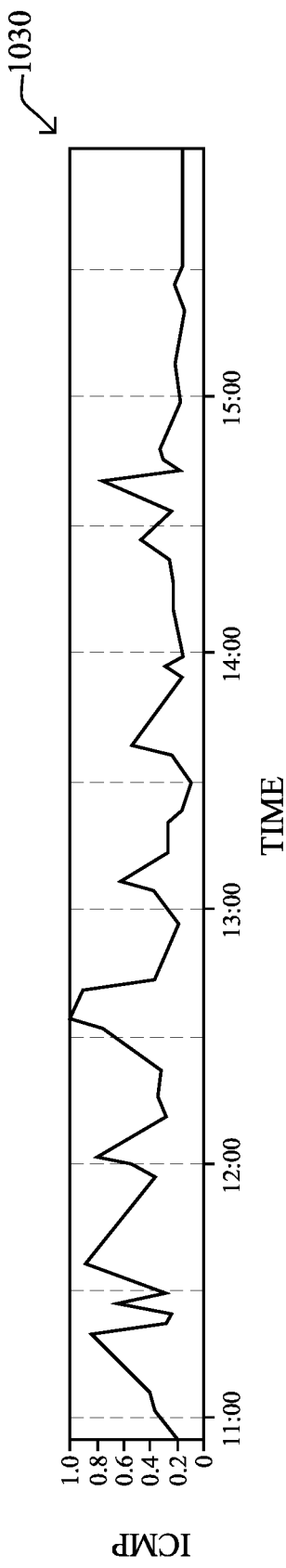
Figure 10E:
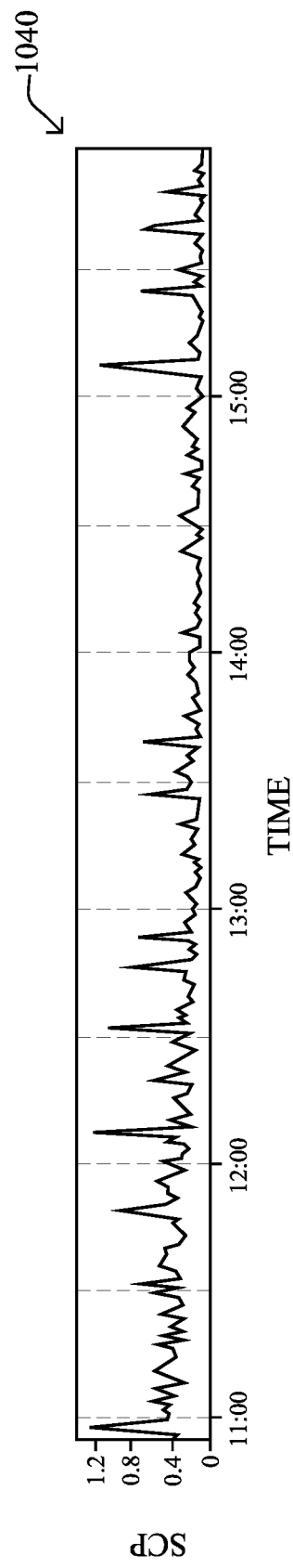
Figure 11A:
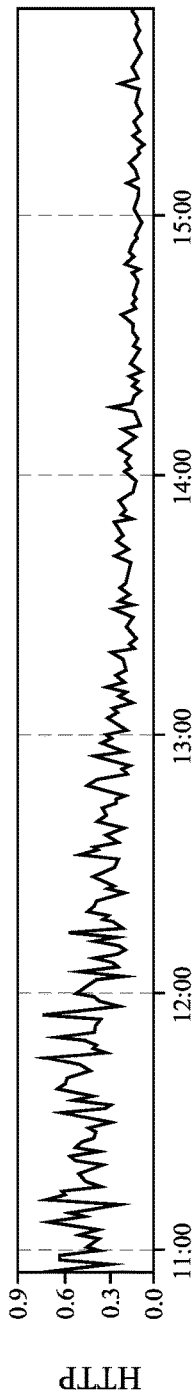
FIGS. 11A-11E illustrate an example trace of benign traffic data using the filtering techniques herein.
Figure 11B:
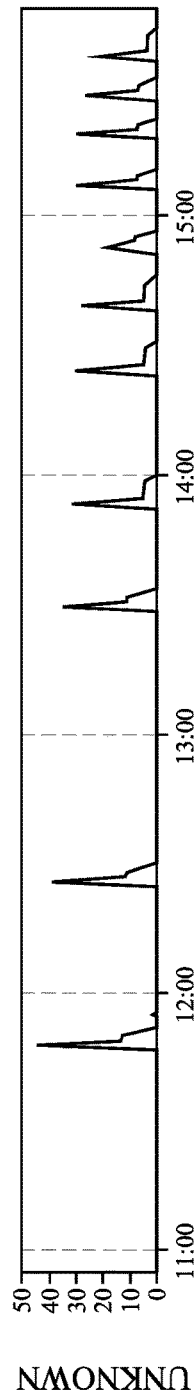
Figure 11C:
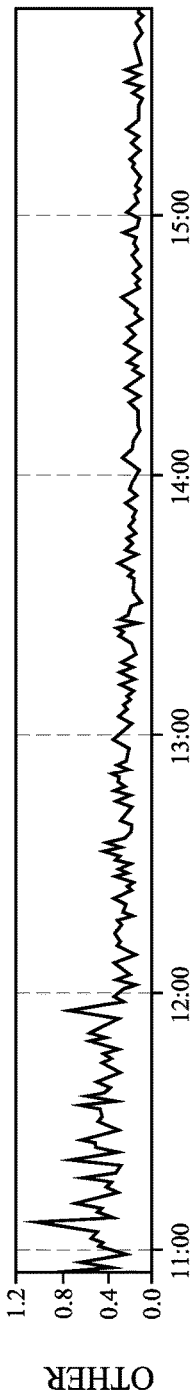
Figure 11D:
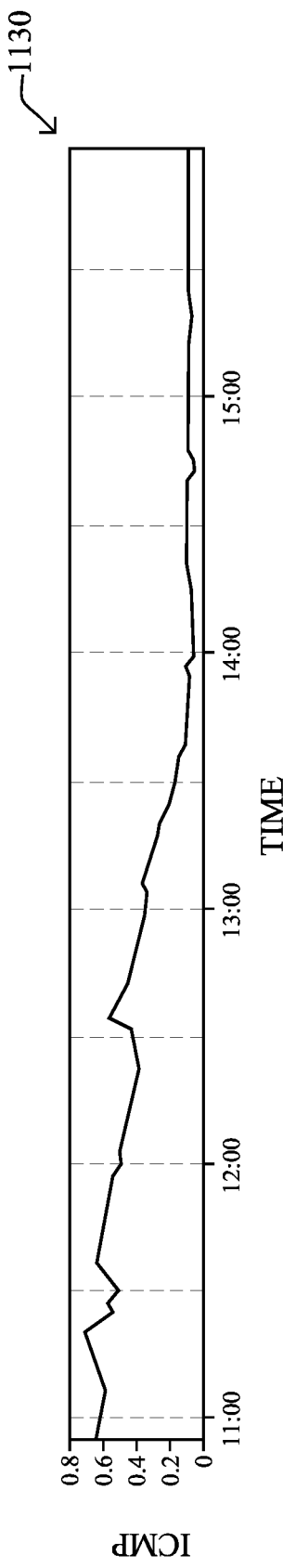
Figure 11E:
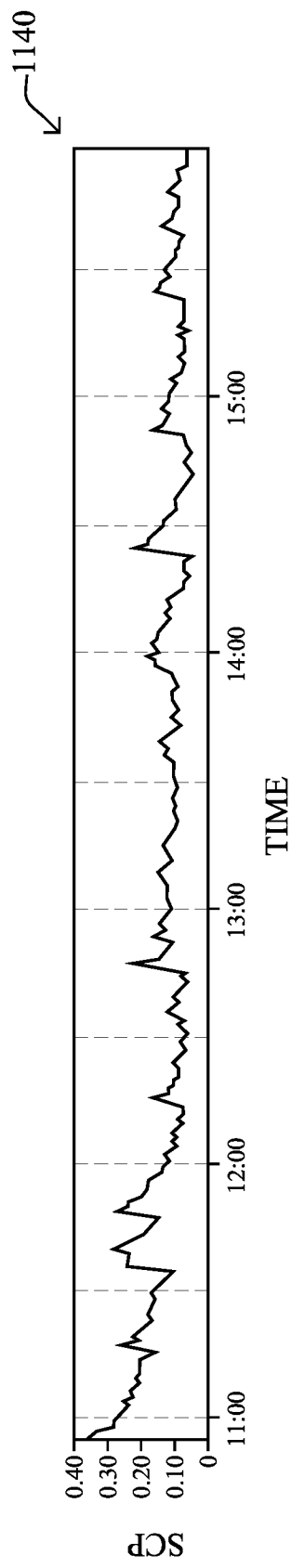

FIGS. 7A-7B illustrate the time evolution of the mean number of packets per destination from the prototype. More specifically, plot 700 in FIG. 7A illustrates the original and filtered values over time for the mean packets per destination feature. As shown, during the daytime, the traffic is high and so is the value of the feature. This feature is computed on many samples, and the measurement noise estimated by bootstrapping is low. Thus, the filtered value is close to the measured value. However, as shown in subgraph 710 illustrated in greater detail in FIG. 7B, when the traffic becomes low, the measurement noise becomes higher and the Kalman filter, relying more on the transition model, estimates a rough average of the measured value. At 3:00 AM, a cut of activity is observed for about two hours. After this period, the process noise of the transition model, which depends on the time delta between the previous sample and the current sample, increases and becomes even higher than the measurement noise. Thus, the Kalman filter relies more on the measurement and gives an estimate close to the measured one.

This mechanism allows the anomaly detection system to fully leverage the information provided by both current measurement and the previous latent value, taking into account both sources of noise, to give the best possible estimate of the actual value of the feature. Kalman filters also provide a measure of confidence for the provided estimate, which is useful information to forward to the anomaly detection process(es) that rely on those features.

Up until this point, the assumption has been made that the state $x_t$ is one-dimensional, i.e., the value of the computed feature. However, in further embodiments, the techniques herein can also be applied to a larger dimensional state with the speed, acceleration, etc. of the feature value. The transition model can then be made non-invariant, by inferring the current derivatives of the feature value from the data. In effect, the transition model becomes an actual dynamical system, which can take into account the local evolution of the features.

Further prototype results are illustrated in FIGS. 8A-11E. Notably, FIGS. 8A-8E illustrate an example trace of a network attack without filtering and FIGS. 9A-9E illustrate an example trace of the network attack using the filtering techniques herein. During testing, the anomaly detection process aggregated traffic features as input and attempted to detect anomalies as deviations from the normal traffic patterns modeled using an auto-encoder. This score is the residual of the auto-encoder, so large peaks in the signal represent anomalies.

Each of the plots in FIGS. 8A-9E illustrate the anomaly scores for the corresponding feature, both with and without filtering. Notably, plots 800 and 900 illustrate the anomaly score for an 'unknown' feature, without and with filtering, respectively. Plots 810 and 910 illustrate an 'other' feature, without and with filtering, respectively. Plots 820 and 920 illustrate an HTTP type feature (e.g., HTTP related traffic), without and with filtering, respectively. Plots 830 and 930 illustrate an SCP type feature (e.g., SCP traffic), without and with filtering, respectively. Plots 840 and 940 illustrate a DNS feature (e.g., DNS traffic), without and with filtering, respectively.

More specifically, FIGS. 8A-9E shows a trace where two DDoS attacks (at 5:00 and 6:00) and 3 FFSN attacks (at 4:00, 4:30 and 5:00) were performed. Here, all applications except SCP had low measurement noise, due to a large number of observed flows. Thus, all applications but SCP were widely unaffected by the filter. SCP has a high measurement noise and is affected a lot by the filter. The sharp peaks decrease slower with the filter than without, as the uncertainty is higher and thus the filter relies more on the transition model. However the maximum magnitude of the peak is maintained so the anomalies will be detected nonetheless.

FIGS. 10A-10E and 11A-11E illustrate another test trace without the presence of a simulated attack. Notably, plots 1000 and 1100 illustrate the anomaly score for an HTTP type feature, without and with filtering, respectively. Plots 1010 and 1110 illustrate an 'unknown' feature, without and with filtering, respectively. Plots 1020 and 1120 illustrate an 'other' feature, without and with filtering, respectively. Plots 1030 and 1130 illustrate an ICMP type feature, without and with filtering, respectively. Plots 1040 and 1140 illustrate an SCP feature, without and with filtering, respectively.

As shown in FIGS. 10A-11E, both SCP and ICMP have high measurement noise, so both are smoothed a lot by the filtering. ICMP, however, is flattened much more than SCP, as the transition noise (caused by large time difference between two samples), is also very large. By smoothing the scores of the SCP and ICMP features, the filtering mechanism may prevent false positives, which may otherwise exist with such scare data. In other words, plots 1030-1040 in FIGS. 10D-10E may be considered anomalous even though the trace is of benign traffic (i.e., a false positive), whereas plots 1130-1140 in FIGS. 11D-11E with the filtering applied may not be considered anomalous due to the smoothing effect.

Figure 12A:
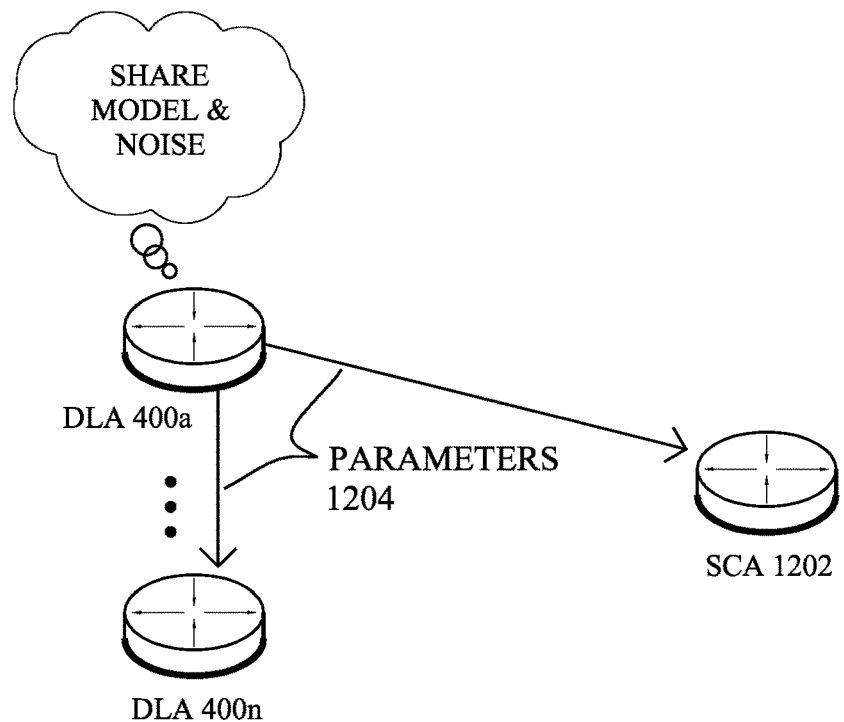
FIGS. 12A-12B illustrate the sharing of filter parameters in a network.
Figure 12B:
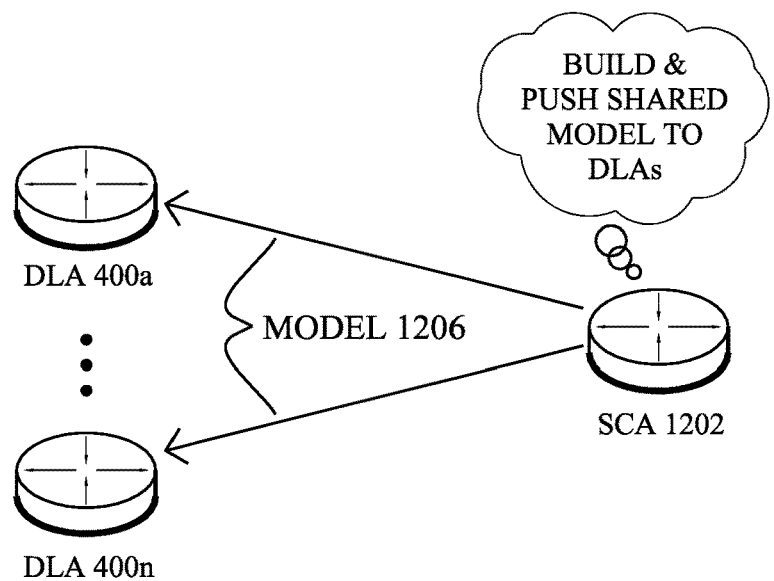

FIGS. 12A-12B illustrate the sharing of filter parameters in a network, according to various embodiments. As would be appreciated, the performance of the applied filter (e.g., the Kalman filter, etc.) will heavily depend on the accuracy of its parameters. The measurement model and noise, for instance, are key parameters that require large amounts of data to be estimated accurately. To this end, it is useful for DLAs to share these parameters, either in a peer-to-peer fashion or indirectly via the SCA, in order to improve their accuracy. For example, as shown in FIG. 12A, DLA 400a may share its filter parameters with SCA 1202 and/or any of the other deployed DLAs in the network (e.g., one or more DLAs up to an nth DLA, DLA 400n).

Directly sharing the parameters of the Kalman filter or other model is tricky as they depend heavily upon the specifics of each DLA. The measurement noise for instance, estimated via bootstrapping, depends strongly on the number of samples and, for some features, on the time of day. It may even depend on some other variables. These variables are specific to each DLA and depend on the size of the branch and characteristics of the branch.

In one embodiment, one way of achieving this sharing of noise estimate is for each DLA to publish, for each confidence estimate, a set of features describing the situation when this estimate was established. These features could include the number of samples used to perform bootstrapping, the time of day, the number of observed hosts in the branch etc. The SCA may then aggregate all these pairs of features and confidence estimate from all DLAs and build a shared model of the confidence using machine learning regression techniques. Other parameters of the filter for all DLAs, like the transition and measurement models of a Kalman filter, could be shared in a similar fashion to that shown in FIG. 12A.

As shown in FIG. 12B, SCA 1202 may then share/broadcast the built models to all of DLAs 400a-400n which may use them to improve the accuracy of their own confidence estimates. In addition to increasing the accuracy of the confidence estimates of each DLA, this mechanism would allow newly added DLAs to directly obtain good models for the confidence on the features used for anomaly detection, and thus improve the efficiency of the anomaly detection system.

Figure 13:
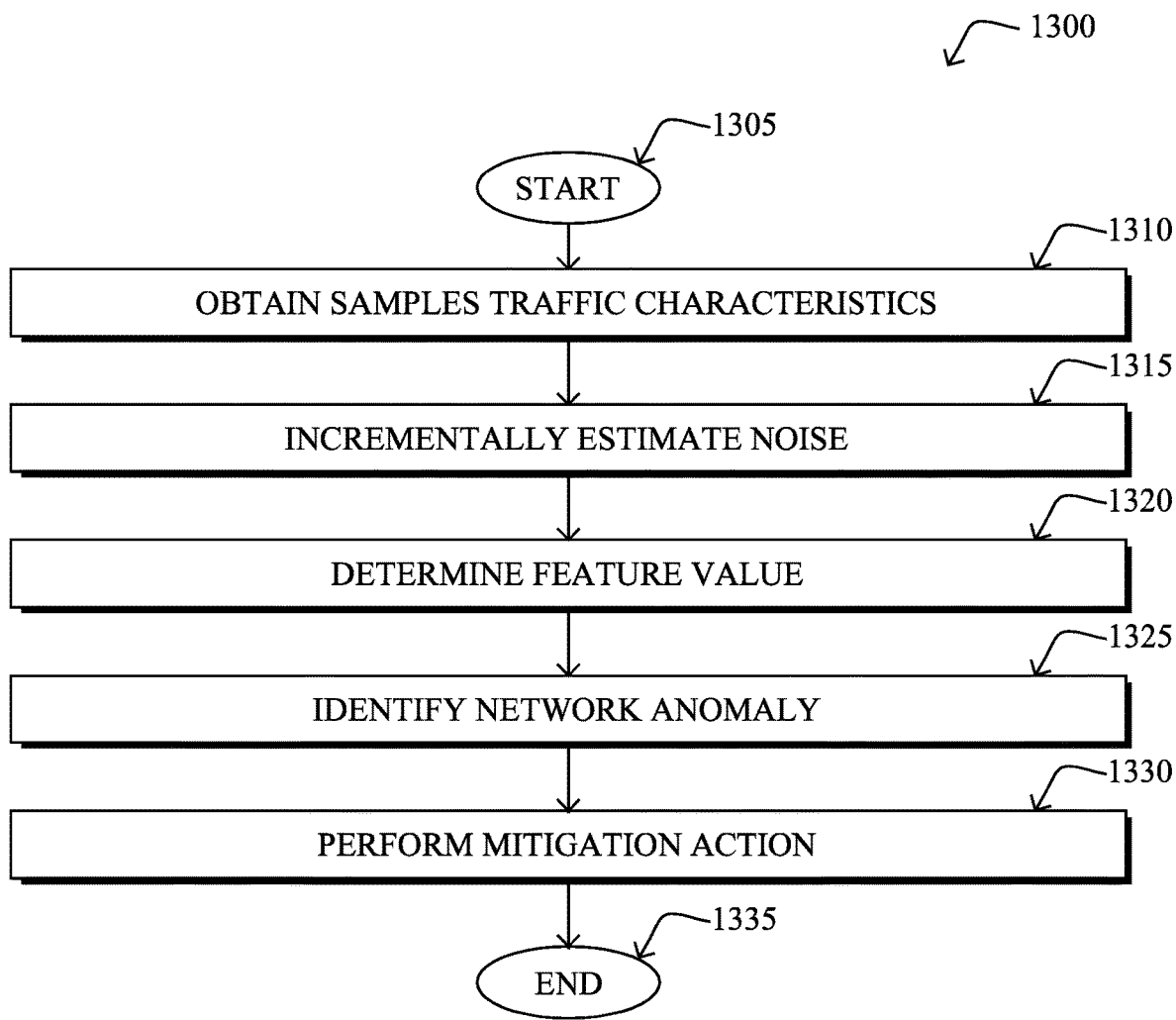
FIG. 13 illustrates an example simplified procedure for performing anomaly detection in a network.

FIG. 13 illustrates an example simplified procedure for performing anomaly detection in a network, in a network in accordance with one or more embodiments described herein. For example, a non-generic, specifically configured device (e.g., device 200) may perform procedure 1300 by executing stored instructions (e.g., process 248). The procedure 1300 may start at step 1305, and continues to step 1310, where, as described in greater detail above, a device in a network may obtain sampled traffic characteristics regarding one or more traffic flows in the network. In some embodiments, the traffic flow(s) may flow through the device itself, allowing the device to capture the characteristics directly. In other embodiments, the device may receive the sampled traffic characteristics from another node/device in the network (e.g., a Netflow or IPFIX exporter, etc.). Generally, the characteristics of a traffic flow may include any information of the flow available through analysis of the packets of the flow. For example, such characteristics may include, but are not limited to, source and/or destination information, protocol(s) used by the flow, byte or payload sizes, an application associated with the flow, etc.

At step 1315, as detailed above, the device may incrementally estimate an amount of noise associated with the sampled traffic flow characteristics. In various embodiments, the device may determine the noise using boostrapping of the sampled characteristics (e.g., across different sample bins, etc.). Additionally, the characteristics may be used to determine one or more machine learning features for use by an anomaly detector such as statistics (e.g., averages, maximums, minimums, etc.) regarding the sampled characteristics or other measurements derived therefrom.

At step 1320, the device may determine a value for the machine learning feature using the estimated noise from step 1315, as described in greater detail above. In various embodiments, the device may do so by applying a Kalman or other filter to the noise, to estimate the "true" value of the feature in view of the estimated noise.

At step 1325, as detailed above, the device may identify a network anomaly based on the feature value from step 1320. For example, the device may use the estimated "true" value of the feature as input to a machine learning-based anomaly detector, to detect the anomalous condition in the network.

At step 1330, the device may perform one or more mitigation actions based on the detected anomaly, as described in greater detail above. Notably, once the device has detected the anomaly, the device may drop or block the anomalous traffic flow(s), generate one or more alerts (e.g., to an administrator, to one or more other devices in the network, etc.), or perform any number of other actions that can mitigate the effects of the anomaly. Procedure 1300 then ends at step 1335.

It should be noted that while certain steps within procedure 1300 may be optional as described above, the steps shown in FIG. 13 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, simplify the learning problem in network anomaly detection systems and help to more accurately estimate the noise on the features in such systems. In turn, the techniques can be used to estimate the true value of the feature(s) in a computationally cheap manner.

While there have been shown and described illustrative embodiments that provide for the estimation of feature confidence in a network anomaly detection system, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a device in a network, sampled characteristic data regarding one or more traffic flows in the network;
   deriving a machine learning feature from the sampled characteristic data;
   incrementally estimating, by the device, an amount of noise corresponding the machine learning feature using a bootstrapping process, wherein characteristic data from the sampled characteristic data for a particular sampling time period is randomly selected to form a plurality of subsets of the characteristic data for the sampling time period;
   applying, by the device, a filter to the estimated amount of noise corresponding to the machine learning feature, to determine a value for the machine learning feature, wherein applying the filter results in an estimation of a true value of the machine learning feature and a degree of confidence for the machine learning feature;
   identifying, by the device, a network anomaly that exists in the network by using the determined value for the machine learning feature as input to a machine learning-based anomaly detector; and
   causing, by the device, performance of an anomaly mitigation action based on the identified network anomaly.

2. The method as in claim 1, wherein the anomaly mitigation action comprises at least one of: dropping the one or more traffic flows or generating a notification regarding the identified network anomaly.

3. The method as in claim 1, wherein the sampled characteristic data comprises at least one of: an application associated with the one or more traffic flows, a protocol used by the one or more traffic flows, a destination of the one or more traffic flows, or a byte size associated with the one or more traffic flows.

4. The method as in claim 1, wherein the filter comprises at least one of: a Kalman filter or a particle filter.

5. The method as in claim 1, wherein incrementally estimating the amount of noise comprises:
   computing, by the device, a feature value from the plurality of subsets of the characteristic data; and
   determining, by the device, a standard deviation of the computed feature value over time.

6. The method as in claim 5, further comprising:
   randomly selecting, by the device, characteristic data from the sampled characteristic data for a plurality of sampling time periods, wherein the feature value is computed based in part on the selected characteristic data for the plurality of sampling time periods.

7. The method as in claim 1, further comprising:
   communicating, by the device, one or more parameters of the filter to another device in the network.

8. The method as in claim 1, further comprising:
   receiving, at the device, one or more filter parameters based on filter parameters used by a plurality of other devices in the network.

9. An apparatus, comprising:
   one or more network interfaces to communicate with a network;
   a processor coupled to the network interfaces and configured to execute one or more processes; and
   a memory configured to store a process executable by the processor, the process when executed operable to:
      obtain sampled characteristic data regarding one or more traffic flows in the network;
      derive a machine learning feature from the sampled characteristic data;
      incrementally estimating an amount of noise corresponding to the machine learning feature using a bootstrapping process, wherein characteristic data from the sampled characteristic data for a particular sampling time period is randomly selected to form a plurality of subsets of the characteristic data for the sampling time period;

apply a filter to the estimated amount of noise corresponding to the machine learning feature, to determine a value for the machine learning feature, wherein applying the filter results in an estimation of a true value of the machine learning feature and a degree of confidence for the machine learning feature;

identify a network anomaly that exists in the network by using the determined value for the machine learning feature as input to a machine learning-based anomaly detector; and cause performance of an anomaly mitigation action based on the identified network anomaly.

10. The apparatus as in claim 9, wherein the anomaly mitigation action comprises at least one of: dropping the one or more traffic flows or generating a notification regarding the identified network anomaly.

11. The apparatus as in claim 9, wherein the sampled characteristic data comprises at least one of: an application associated with the one or more traffic flows, a protocol used by the one or more traffic flows, a destination of the one or more traffic flows, or a byte size associated with the one or more traffic flows.

12. The apparatus as in claim 9, wherein the filter comprises at least one of: a Kalman filter or a particle filter.

13. The apparatus as in claim 9, wherein the apparatus incrementally estimates the amount of noise by:

computing a feature value from the plurality of subsets of the characteristic data; and determining a standard deviation of the computed feature value over time.

14. The apparatus as in claim 9, wherein the process when executed is further operable to:

randomly select data from the sampled characteristic data for a plurality of sampling time periods, wherein the feature value is computed based in part on the selected characteristic data for the plurality of sampling time periods.

15. The apparatus as in claim 9, wherein the process when executed is further operable to:

communicate one or more parameters of the filter to another device in the network.

16. The apparatus as in claim 9, wherein the process when executed is further operable to:

receive one or more filter parameters based on filter parameters used by a plurality of other devices in the network.

17. A non-transitory computer-readable media having software encoded thereon, the software when executed by a device in a network operable to:

obtain sampled characteristic data regarding one or more traffic flows in the network;

derive a machine learning feature from the sampled characteristic data;

incrementally estimate an amount of noise corresponding to a machine learning feature using a bootstrapping process, wherein characteristic data from the sampled characteristic data for a particular sampling time period is randomly selected to form a plurality of subsets of the characteristic data for the sampling time period;

apply a filter to the estimated amount of noise corresponding to the machine learning feature, to determine a value for the machine learning feature, wherein applying the filter results in an estimation of a true value of the machine learning feature and a degree of confidence for the machine learning feature;

identify a network anomaly that exists in the network by using the determined value for the machine learning feature as input to a machine learning-based anomaly detector; and cause performance of an anomaly mitigation action based on the identified network anomaly.

18. The computer-readable media as in claim 17, wherein the anomaly mitigation action comprises at least one of: dropping the one or more traffic flows or generating a notification regarding the identified network anomaly.

19. The computer-readable media as in claim 17, wherein the device incrementally estimates the amount of noise by:

computing a feature value from the plurality of subsets of the characteristic data; and determining a standard deviation of the computed feature value over time.

20. The computer-readable media as in claim 19, wherein the software when executed by the device is further operable to:

randomly select, by the device, characteristic data from the sampled characteristic data for a plurality of sampling time periods, wherein the feature value is computed based in part on the selected characteristic data for the plurality of sampling time periods.

\* \* \* \* \*